United States Patent [19]
Phelps, III et al.

[11] Patent Number: 5,895,729
[45] Date of Patent: Apr. 20, 1999

[54] BATTERY LATCH ASSEMBLY FOR TWO-WAY RADIO

[75] Inventors: William Phelps, III, Lawrenceville; Mark C. Taraboulos, Chamblee; Vito Dionisio, Jr., Lawrenceville, all of Ga.

[73] Assignee: Motorola, Inc., Schaumburg, Ill.

[21] Appl. No.: 08/937,431

[22] Filed: Sep. 25, 1997

[51] Int. Cl.⁶ .................................................. H01M 2/10
[52] U.S. Cl. ........................... 429/97; 429/98; 429/123
[58] Field of Search .................................. 439/96, 97, 98, 439/99, 100, 123; 455/90, 347, 348, 349; 361/600, 814

[56] References Cited

U.S. PATENT DOCUMENTS

| | | |
|---|---|---|
| 5,460,906 | 10/1995 | Leon et al. ............................ 429/97 |
| 5,607,791 | 3/1997 | Garcia et al. ......................... 429/96 |
| 5,607,792 | 3/1997 | Garcia .................................... 429/97 |
| 5,665,485 | 9/1997 | Kuwayama et al. ................. 429/100 |

*Primary Examiner*—Maria Nuzzolillo
*Assistant Examiner*—Jonathan Crepeau
*Attorney, Agent, or Firm*—Felipe J. Farley

[57] ABSTRACT

A removable battery package (120) has a latch assembly (200) for attaching to a latch coupler (700) of an electronic device (110). The removable battery package (120) includes a socket (432) that mates with the latch coupler (700). A resilient, deflectable latch member (260) is secured within the socket (432). The latch member (260) has a latch portion (266, 268) to engage a portion (715) of the latch coupler (700). A button (270), mounted on the latch member (260), is depressible to deflect the latch member (260).

12 Claims, 3 Drawing Sheets

BATTERY LATCH ASSEMBLY FOR TWO-WAY RADIO

CROSS REFERENCE TO RELATED APPLICATIONS

This application is related to issued U.S. application Ser. No. 595,444, filed Feb. 5, 1996, by Garcia et al., entitled "Battery Latch", and assigned to Motorola, Inc.

TECHNICAL FIELD

This invention relates in general to portable radio batteries, and more specifically to latches for radio batteries.

BACKGROUND

Portable electronic devices, such as two-way radios and telephones, typically require a portable source of power such as a battery. A battery supply may be conveniently attached to the housing of the electronic device and make electrical contact by way of a conventional connector. To facilitate battery replacement, mechanisms have been devised to enable the user to easily disconnect a spent battery and replace it with a freshly charged battery. Generally, the detachable battery is securely affixed to the electronic device by way of some sort of latching mechanism. Often, the latching mechanism is integrated into a battery housing.

Although their primary function is to retain the battery to the electronic device, battery housing latches are typically required to perform multiple tasks. For example, the latch is used to ensure a snug fit between the battery and the electronic equipment. Furthermore, the latch often carries the burden of providing drop protection for the entire battery assembly. The difficulty associated with latch design optimization is compounded by often competing design requirements. For example, while the latch should be designed to provide a snug fit between the battery assembly and the equipment housing (i.e., preventing disengagement when the product is dropped) the user must be able to engage and disengage the battery housing with minimal effort.

Manufacturers of portable electronic equipment are constantly trying to improve latch designs to meet these aforementioned requirements, often under cost and manufacturing constraints. For example, commonly assigned U.S. Pat. No. 5,607,792 describes a removable battery package which incorporates a reliable and efficient button latch assembly which has been incorporated into removable battery packs for portable radios. Still, it would be desirable to have a similar type of latch mechanism which is even more reliable and results in the decreased occurrence of latch related defects during manufacturing.

DETAILED DESCRIPTION OF THE PREFERRED EMBODIMENT

Figure 1:
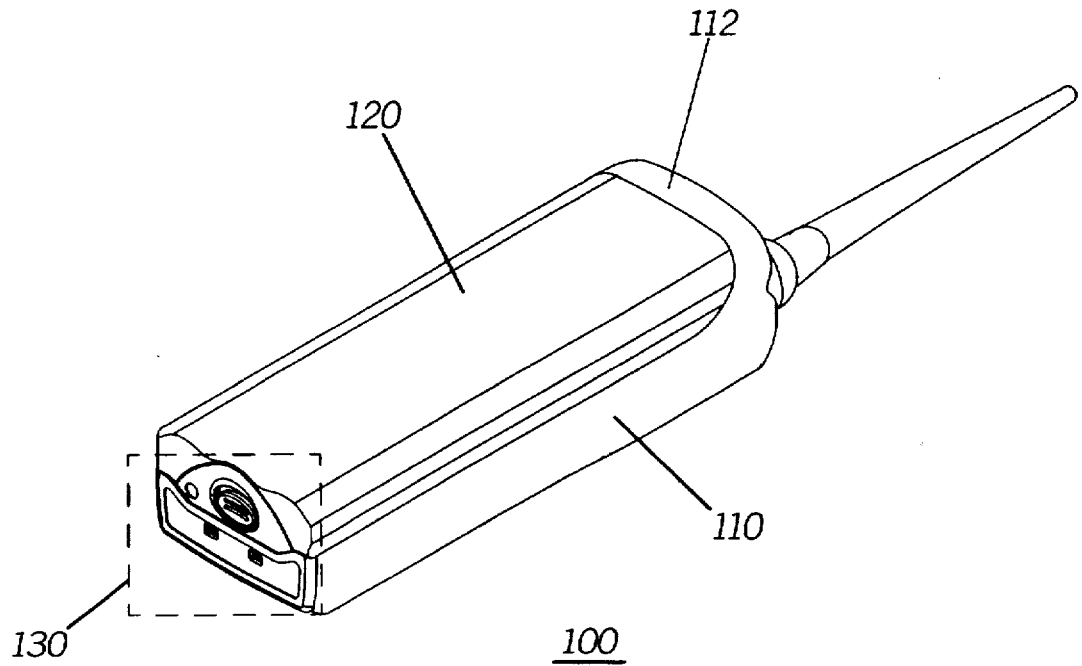
FIG. 1 is a perspective view of an electronic device and battery assembly, in accordance with the present invention.

While the specification concludes with claims defining the features of the invention that are regarded as novel, it is believed that the invention will be better understood from a consideration of the following description in conjunction with the drawing figures, in which like reference numerals are carried forward.

Generally, the present invention provides for a battery latch system for securing a removable battery package to an electronic device. The battery latch system includes a latch coupler on the electronic device and a latch assembly on the battery package. The latch assembly includes a socket on the housing of the battery package that mates with the latch coupler. A resilient, deflectable latch member is secured within the socket. The latch member has a portion that engages with the latch coupler. A button, mounted on the latch member, is depressible to deflect the latch member.

FIG. 1 is a perspective view of an electronic device and battery assembly 100, in accordance with the present invention. In the preferred embodiment, the electronic device is a two-way portable radio having circuitry for communicating over radio frequency channels. The battery provides power to operate the radio. The assembly 100 includes a radio housing 110, and a removable battery package 120 attached to the radio housing 110. The battery package 120 is secured to the radio housing 110 via a lip portion 112 on the radio, and by a battery latch system 130 having a portion on the battery package 120 and a portion on the radio housing 110.

Figure 2:
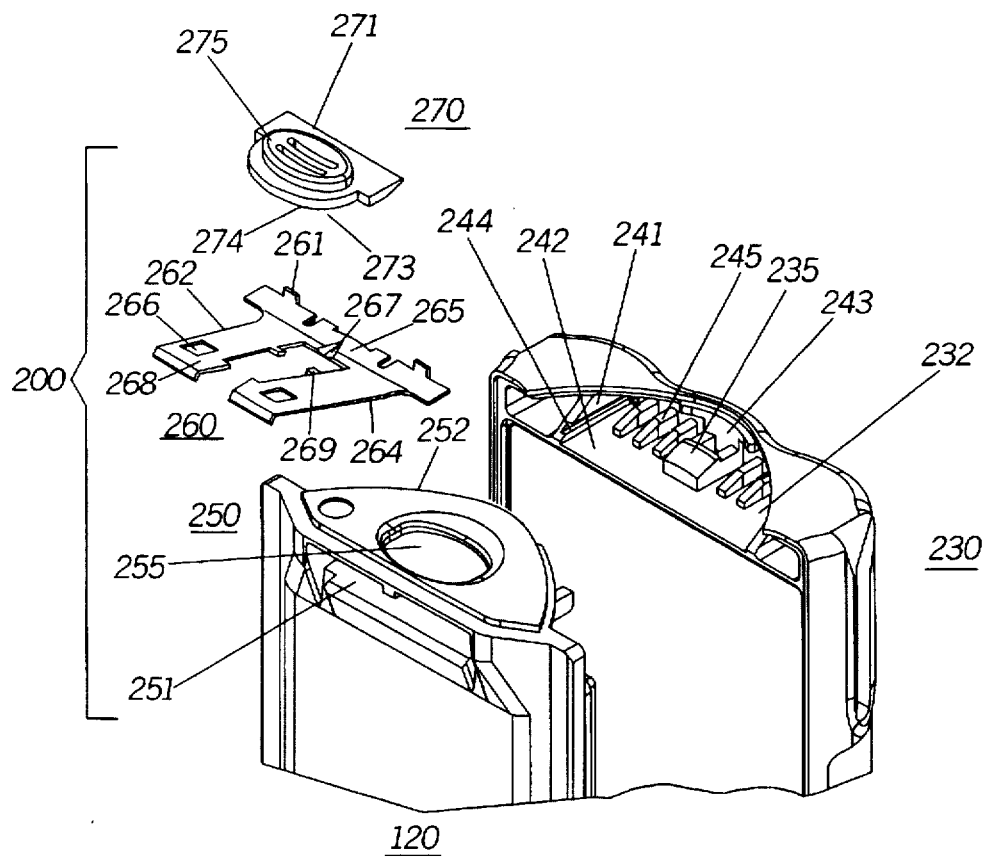
FIG. 2 is a fragmentary, exploded, perspective view of the battery package, in accordance with the present invention.

FIG. 2 is a fragmentary, exploded, perspective view of the battery package 120, in accordance with the present invention. The battery latch assembly 200 constitutes the portion of the battery latch system on the battery package. The battery latch assembly 200 is formed from a portion of a battery housing member 230, a portion of a second battery housing member or battery cover 250, a latch member 260, and a button 270. The battery housing member 230 is preferably formed from plastic in a single piece mold construction. The battery housing member 230 has a latch mount portion 232 in the form of a recess or cavity in the battery housing member 230. The latch mount portion 232 is defined by a plurality of sidewalls 241, 242, 243, that form the surfaces of the latch mount portion 232. An integral guide channel 244 is provided in sidewall 241 for guiding the latch member into the latch mount portion 232. Latch mount portion 232 further includes a raised portion or projection 235 extending within the cavity that forms a retention member or stop for the latch member 260, and tapered projections 245 extending from at least one surface 243. Thus, the integral channels 244 form mounting guides for mounting the latch member 260, the tapered projections 245 provide mechanical support for the latch member 260, and the raised portion 235 serves to secure the latch member 260.

The latch member 260 is a resilient cantilever structure preferably formed from stamped sheet metal. In the preferred embodiment, the latch member 260 includes two resilient cantilever arms 262, 264 connected by a bridge member 265. The bridge member 265 has a V-shaped notch 267 formed therein and a pair of integral tabs 261 disposed perpendicular to the plane of the bridge member for keying the latch (i.e., for preventing improper insertion of the latch member 260 into the latch mount portion 232). The cantilever arms 262, 264 are angled upwards to provide a preloaded force, and latch portions or catches 266 extend through an end portion of each respective cantilever arm. A button receiving portion is formed between the cantilever arms. Once received, the button is locked in place between first and second pairs of tabs 268, 269 extending inwardly from the cantilever arms.

Figure 3:
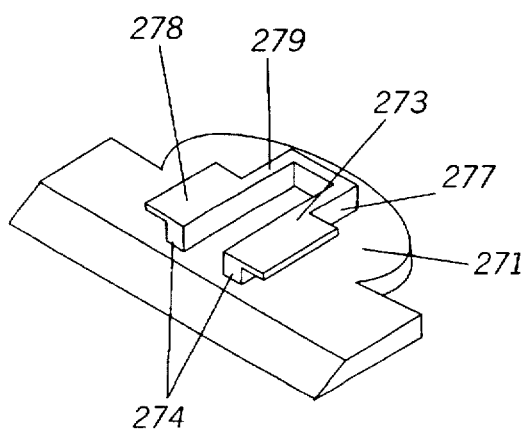
FIG. 3 is a perspective view showing the underside or bottom surface of the button of FIG. 2, in accordance with the present invention.

The button 270 is preferably formed from molded plastic. The button 270 has a finger grip portion 275 formed on a platform 271. Referring briefly to FIG. 3, a mount base 273 extends from beneath the platform to form a retention pocket 274 between the platform 271 and the mount base 273. A button sidewall 277 connects the mount base 273 and the platform 271.

Figure 4:
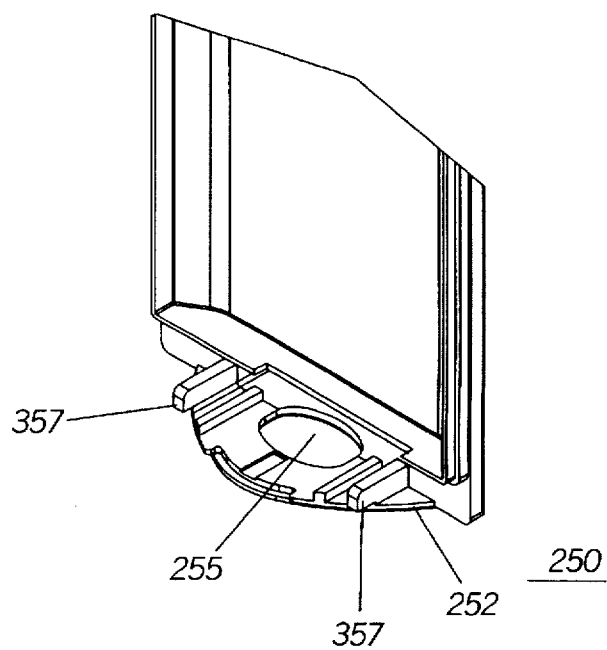
FIG. 4 is a fragmentary perspective view showing the underside or bottom surface of the battery cover of FIG. 2, in accordance with the present invention.

The battery cover 250 is preferably formed from molded plastic. The battery cover 250 attaches to the battery housing member 230 to form an enclosure. The battery cover 250 has an overhang wall portion 252 extending over the latch mount portion 232 of the battery housing member 230. The battery cover 250 has a button hole 255 for accommodating the button 270. The battery cover 250 also has a passage 251 extending therethrough that provides access to the latch member 260. FIG. 4 is a fragmentary perspective view showing the underside or bottom surface of the battery cover 250. Latch member retainers 357 are also formed on the battery cover 250 to aid in securing the latch member 260 within the latch assembly 200.

Figure 5:
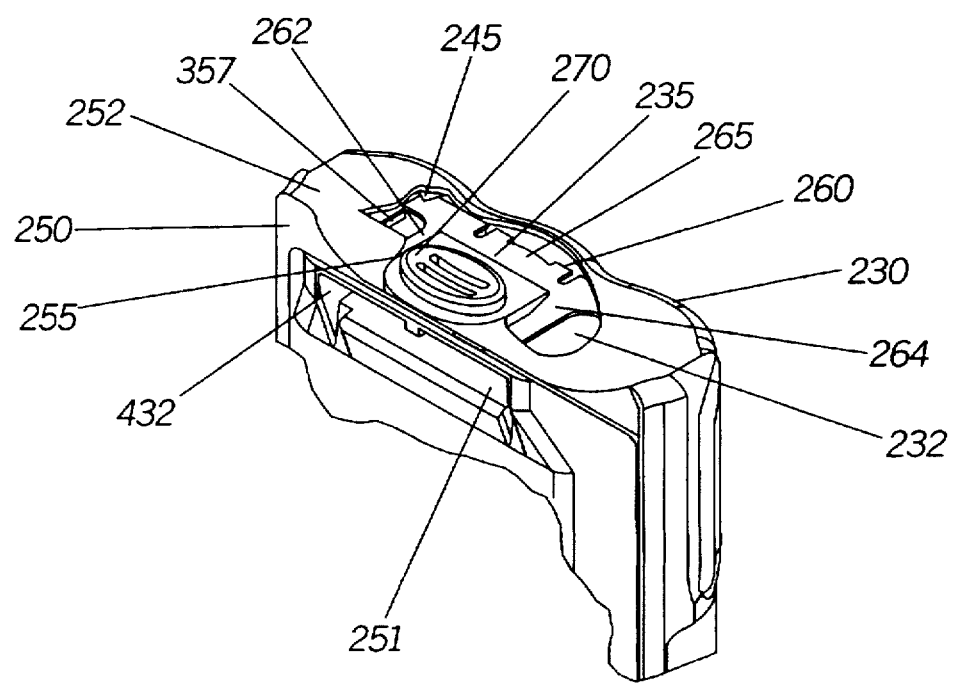
FIG. 5 is a fragmentary, cut away view of the battery package showing a fully assembled latch assembly, in accordance with the present invention.

FIG. 5 is a fragmentary, cut away view of the battery package showing a fully assembled latch assembly, in accordance with the present invention. The battery cover 250 is attached to the battery housing member 230. The overhang wall portion 252 of the battery cover fits over the recessed latch mount portion 232 of the battery housing, and together with the passage 251 of the battery cover 250, form an open face enclosure or latch socket 432 that houses the latch member 260. As the latch member 260 is enclosed within the latch socket 432, it is protected from damage when the battery package is dropped accidentally.

Referring now to FIGS. 2 and 5, the latch member 260 is mounted within the latch mount portion 232 such that the V-shaped notch 267 formed in the bridge member 265 engages the retention member 235 to secure the latch member 260 within the latch mount portion 232. The latch member 260 is further secured within the latch mount portion 232 by the latch member retainers 357. The latch member 260 is disposed or mounted within the latch socket such that it is resilient and the preloaded or angled portions of the cantilever arms 262, 264 are deflectable. The cantilever arms 262, 264 extend within the latch socket toward the battery cover passage 251. Once the battery housing member 230 and battery cover 250 are mechanically attached, e.g., ultrasonically welded together, the button 270 is snap-fitted into place. The button 270 is inserted through passage 251 and slidably mounted onto latch member 260, between the cantilever arms 262, 264. More specifically, the retention pocket portion 274 of the button guides the button along the cantilever arms 262, 264. Tapered tabs 268 exert force against the button sidewall 277 as the button is being inserted. The portion of the sidewalls 278 forming the retention pockets 274 are thicker than the remaining sidewall portion 279. The step created at this juncture allows the tapered tabs to move closer together, effectively snap fitting the button in place between latch member tabs 268 and 269. Substantially simultaneously, the preloaded cantilever arms 262, 264 force the button upwards toward the button hole 255. The button hole 255 on the battery cover 250 is positioned over the latch member 260 and aligned with the button 270. The preloaded cantilever arms force the finger grip portion 275 of the button through the button hole. The latch member 260 remains accessible through the passage 251 that forms the open face of the latch socket 432.

This method of latch assembly, achievable through our improved latch assembly design, results in a marked advance in battery latch reliability and battery packet assembly yield. Previously, it was necessary to attach the button 270 before permanently attaching (e.g., welding) the two halves 230, 250 of the battery pack housing together—resulting in assembly defects. A number of benefits have accrued from our improved design. Previously, when the two halves 230, 250 of the battery housing were inadvertantly attached prior to placement of the button 270, the partially assembled battery pack had to either be scrapped or reworked (to insert the button), resulting in lower manufacturing yields, increased assembly cycle times and higher costs. This problem is precluded under the present scheme, since the button is snapped into place subsequent to attachment of halves 230 and 250. Furthermore, under the prior approach, battery latch reliability was sometimes negatively affected by inadvertant welding of the button 270 to the latch mechanism 260. With welding performed prior to button attachment, this issue has also been eliminated.

Figure 6:
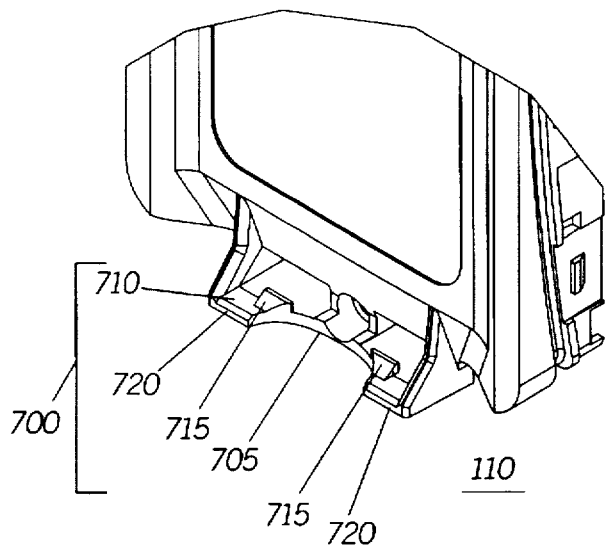
FIG. 6 is a fragmentary, perspective view of the radio housing highlighting a latch coupler, in accordance with the present invention.

FIG. 6 is a fragmentary, perspective view of the radio housing highlighting a portion of the latch system, in accordance with the present invention. The radio housing 110 includes a latch coupler or plug portion 700 that mates with the latch assembly 200 of the battery package 120. The latch coupler 700 has catches 715 that correspond to the catches 266 on the latch member 260 of the latch assembly 200. In the preferred embodiment, the catches are protrusions extending from one surface 710 of the latch coupler 700. The latch coupler 700 further includes tabs 720 to aid in disassembling the latch coupler from the mount socket when the latch coupler 700 is mounted improperly. A concave surface 705 accommodates or receives the button 270 so as not to interfere with the button assembly when the latch coupler 700 is mated to the latch assembly 200.

Figure 7:
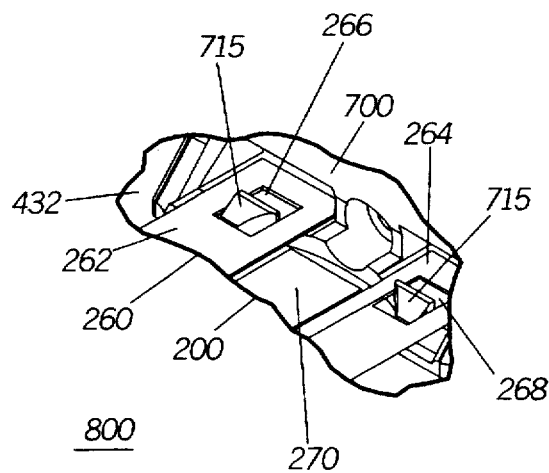
FIG. 7 is a fragmentary, perspective view of a portion of the radio and battery assembly showing the latch coupler engaged with the latch assembly, in accordance with the present invention.

FIG. 7 is a fragmentary, perspective view of a portion of the radio and battery assembly 800 showing the latch coupler 700 engaged with the latch assembly 200, in accordance with the present invention. The latch coupler 700 is mated with the latch socket 432 such that the latch member 260 biasly engages the latch coupler 700. The catches 266 of the latch member 260 engage the catches 715 of the latch coupler to secure the battery package to the radio housing. The button is depressible to deflect the latch member to disengage the latch member from the latch coupler, thereby releasing the battery package from the radio housing.

The present invention provides for significant benefits. The battery latch system provides a reliable, rugged, easily operable, latch mechanism. Most of the latch system components are molded into the battery package housing and others are easily assembled to provide a highly manufacturable, cost effective solution. Furthermore, the improved design affords a more efficient method of assembly which results in increased manufacturing yield and decreased assembly cycle time.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A removable battery package having a latch assembly for attaching to an electronic device, the electronic device having a latch coupler, the removable battery package comprising:

a battery housing having a socket that mates with the latch coupler;

a latch member secured within the socket, the latch member having preloaded cantilever arms connected by a bridge member, the cantilever arms each having a catch for engaging the latch coupler; and a button mounted on the latch member, the button being depressible to deflect the latch member, wherein the preloading of said cantilever arms is achieved by providing cantilever arms bent upwards and away from the plane of the bridge member, the cantilever arms deflectable toward the plane of the bridge member by depressing said button.

2. A removable battery package as described in claim 1, further comprising a battery housing member having a latch mount portion, the latch mount defined by a plurality of sidewalls.

3. A removable battery package as described in claim 2, wherein at least two of said plurality of sidewalls have integral guide channels formed therein for guiding said latch member into the latch mount portion of said battery housing member.

4. A removable battery package as described in claim 1, wherein said bridge member has a V-shaped notch formed therein.

5. A removable battery package as described in claim 1, further comprising first and second pairs of tabs extending inwardly from said cantilever arms, the first pair of tabs being tapered, the first and second pairs of tabs forming a button receiving portion.

6. A removable battery package as described in claim 1, wherein each cantilever arm catch comprises a slot formed in an end portion of the cantilever arm.

7. A removable battery package as described in claim 1, wherein said latch member comprises stamped metal.

8. A removable battery package as described in claim 1, wherein the button is mounted on the latch member after the battery housing and battery cover members are joined together.

9. A battery latch assembly for coupling a battery package to an electronic device, the battery package having a battery housing member and a battery cover member, the latch assembly comprising a battery housing portion formed in the battery housing member, a battery cover portion, a latch member and a button, the housing portion defined by a plurality of sidewalls, the battery cover portion having a button opening formed therethrough, the latch member having two preloaded cantilever arms joined by a bridge member, assembly of the battery latch comprising the consecutively-performed steps of:

(a) inserting the latch member into the latch mount portion of the battery housing member;

(b) attaching the battery housing member to the battery cover member; and (c) snap-fitting the button into the latch member by inserting the button through a passage formed by the battery housing member and the battery cover member, and then sliding the button along the cantilever arms of the latch member.

10. A battery latch assembly as described in claim 9, wherein the step of inserting the latch member further comprises sliding the latch member along guide channels formed in opposing housing portion sidewalls until a V-shaped notch formed in the bridge member snaps into position behind a retention member formed in said battery housing portion.

11. A battery latch assembly as described in claim 9, wherein the step of attaching comprises ultrasonically welding the battery housing member to the battery cover member.

12. A battery latch assembly as described in claim 9, wherein the step of snap fitting further comprises sliding the button along the cantilever arms until the button is locked into place between first and second pairs of tabs extending inwardly from said cantilever arms and a finger grip portion of the button extends through the button opening.

* * * * *